US011279562B2

(12) United States Patent
Ward et al.

(10) Patent No.: US 11,279,562 B2
(45) Date of Patent: Mar. 22, 2022

(54) DIVERTING-FOLDING CONVEYOR SYSTEM

(71) Applicant: Packaging Progressions, Inc., Souderton, PA (US)

(72) Inventors: Andrew Ward, Limerick, PA (US); Charles D. Faust, Bensalem, PA (US); Dante Pietrinferni, Douglassville, PA (US)

(73) Assignee: PACPROINC, LLC, Souderton, PA (US)

( * ) Notice: Subject to any disclaimer, the term of this patent is extended or adjusted under 35 U.S.C. 154(b) by 0 days.

(21) Appl. No.: 17/007,306

(22) Filed: Aug. 31, 2020

(65) Prior Publication Data

US 2021/0061571 A1 Mar. 4, 2021

Related U.S. Application Data

(60) Provisional application No. 62/895,042, filed on Sep. 3, 2019.

(51) Int. Cl.
*B65G 13/10* (2006.01)
*B65G 47/54* (2006.01)
*B65G 47/82* (2006.01)

(52) U.S. Cl.
CPC ............ *B65G 13/10* (2013.01); *B65G 47/54* (2013.01); *B65G 47/82* (2013.01)

(58) Field of Classification Search
None
See application file for complete search history.

(56) References Cited

U.S. PATENT DOCUMENTS

| 4,342,182 A | 8/1982 | Dennis et al. |
| 4,530,435 A * | 7/1985 | Stohlquist ................ B07C 5/32 198/374 |
| 5,400,895 A * | 3/1995 | Hollingsworth ....... B65G 47/50 198/367 |
| 5,768,857 A | 6/1998 | Ward et al. |
| 10,232,409 B2 * | 3/2019 | Dugat .................. B65G 41/002 |
| 10,858,197 B2 * | 12/2020 | Karol ..................... B65G 21/10 |
| 2009/0038913 A1 | 2/2009 | Malenke et al. |
| 2011/0081225 A1 | 4/2011 | Ward et al. |

(Continued)

OTHER PUBLICATIONS

International Search Report received in related PCT Application No. PCT/US2020/047596 dated Jun. 11, 2020.

*Primary Examiner* — Kavel Singh
(74) *Attorney, Agent, or Firm* — Crowell & Moring LLP

(57) ABSTRACT

A folding-diverter assembly is provided to: selectively divert a substrate-product combination advancing from a first direction in a predetermined path based upon the substrate-product combination weighing a predetermined weight; advance the substrate-product combination in a second direction, opposite from the first direction; and fold a flap of the substrate-product combination partially over a top surface of the substrate-product combination. A semi-circular conveyor assembly is configured to advance the substrate-product combination in the second direction at a first portion of the semi-circular conveyor assembly, and along a semi-circular advancing path such that the substrate-product combination is advanced in the first direction at a second portion of the semi-circular conveyor assembly.

16 Claims, 10 Drawing Sheets

(56) References Cited

U.S. PATENT DOCUMENTS

| | | |
|---|---|---|
| 2012/0192526 A1 | 8/2012 | Spix et al. |
| 2014/0090956 A1 | 4/2014 | Lindee |
| 2017/0320606 A1 | 11/2017 | Kuhmichel et al. |

* cited by examiner

DIVERTING-FOLDING CONVEYOR SYSTEM

CROSS-REFERENCE TO RELATED APPLICATIONS

This application claims priority under 35 U.S.C. § 119 as a non-provisional application from U.S. Provisional Application Ser. No. 62/895,042, filed Sep. 3, 2019, which is incorporated herein by reference in its entirety.

FIELD OF INVENTION

The present invention relates a conveyor system, and is more particularly related to a folding and diverting arrangement for a conveyor system.

BACKGROUND

It is known to use conveyors to quickly package products via a series of conveyors and processing assemblies. One type of product is a food product, such as meat patties or bacon slices, which are typically processed and packaged by placing the food product on an underlying substrate. The substrate can include a sheet or card on which a product is placed.

After placing the product on the substrate, the resulting substrate-product combination is further processed or packaged. In some arrangements, a flap of the substrate extends beyond the product itself and relative positioning of the flap is critical for further stacking and/or processing of the product-substrate combination.

During processing, it is difficult to process a large volume of product-substrate combinations while maintaining a specific orientation of the associated substrate flap. Accordingly, it would be desirable to provide a system that reliably orients and folds a flap over a substrate-product combination.

SUMMARY

In one embodiment, a diverting-folding conveyor system is provided. A folding-diverter assembly is configured to: selectively divert a substrate-product combination advancing from a first direction in a predetermined path based upon the substrate-product combination weighing a predetermined weight; advance the substrate-product combination in a second direction, opposite from the first direction; and fold a flap of the substrate-product combination partially over a top surface of the substrate-product combination. A semi-circular conveyor assembly is configured to advance the substrate-product combination in the second direction at a first portion of the semi-circular conveyor assembly, and along a semi-circular path such that the substrate-product combination is advanced in the first direction at a second portion of the semi-circular conveyor assembly.

In one embodiment, the folding-diverter assembly includes a diverting conveyor configured to selectively pivot towards a first path or a second path depending on the predetermined weight of the substrate-product combination. The first path directs the substrate-product combination onto a secondary conveyor aligned with the semi-circular conveyor assembly, and the secondary conveyor is driven in the second direction. The secondary conveyor is arranged vertically below an advancing conveyor that advances the substrate-product combination towards the folding-diverter assembly. The second path directs the substrate-product combination to an off-weight conveyor.

A leading edge of the diverting conveyor is arranged in an advancing path of the secondary conveyor when the diverting conveyor is pivoted towards the first path, such that as the substrate-product combination drops from the diverting conveyor onto the secondary conveyor, the flap of the substrate-product combination is forced into a vertical position and folded onto the substrate-product combination via engagement with the leading edge as the secondary conveyor advances the substrate-product combination in the second direction.

In one embodiment, the folding-diverter assembly includes a diverting pusher configured to drive the substrate-product combination in the second direction, and the diverting pusher is arranged above a secondary conveyor aligned with the semi-circular conveyor assembly. The folding-diverter assembly includes an overhead folding bar arranged above the secondary conveyor and extending along the semi-circular conveyor assembly. The overhead folding bar is configured to hold the flap of the substrate-product combination against the top surface of the substrate-product combination as the diverting pusher drives the substrate-product combination into contact with the overhead folding bar. The diverting pusher includes at least one driving cylinder connected to a frame.

In one embodiment, the semi-circular conveyor assembly has at least a 180 degree curvature. A terminal end of the semi-circular conveyor assembly is preferably aligned with a vacuum packing machine.

A gap (X) is defined between (i) the leading edge when the diverting conveyor is pivoted towards the first path, and (ii) the diverting pusher while in a non-extended position. The gap (X) is less than an overall length (L) of the substrate-product combination in a flat orientation.

In another embodiment, a diverting-folding conveyor system is provided. The system includes a diverting conveyor driven in a first direction and configured to selectively pivot towards a first path or a second path depending on a predetermined weight of a substrate-product combination. The first path directs the substrate-product combination onto a secondary conveyor. The second path directs the substrate-product combination onto an off-weight conveyor. The secondary conveyor is driven in a second direction, opposite from the first direction, and is arranged below the diverting conveyor. A leading edge of the diverting conveyor is arranged in an advancing path of the secondary conveyor when the diverting conveyor is pivoted towards the first path, such that as the substrate-product combination drops from the diverting conveyor onto the secondary conveyor, the flap of the substrate-product combination is folded onto the substrate-product combination via engagement with the leading edge as the secondary conveyor advances the substrate-product combination in the second direction. A semi-circular conveyor assembly is aligned with the secondary conveyor and is configured to advance the substrate-product combination in the second direction at a first portion of the semi-circular conveyor assembly, and along a semi-circular path such that the substrate-product combination is advanced in the first direction at a second portion of the semi-circular conveyor assembly. An overhead folding bar is arranged above the secondary conveyor and extends along the semi-circular conveyor assembly. The overhead folding bar is configured to hold the flap of the substrate-product combination against the top surface of the substrate-product combination as the substrate-product combination is driven along the semi-circular conveyor assembly.

BRIEF DESCRIPTION OF THE DRAWINGS

The foregoing summary as well as the following detailed description which will be best understood when reviewed in conjunction with the drawings, which illustrate a presenting preferred embodiment of the invention.

DETAILED DESCRIPTION

Figure 1:
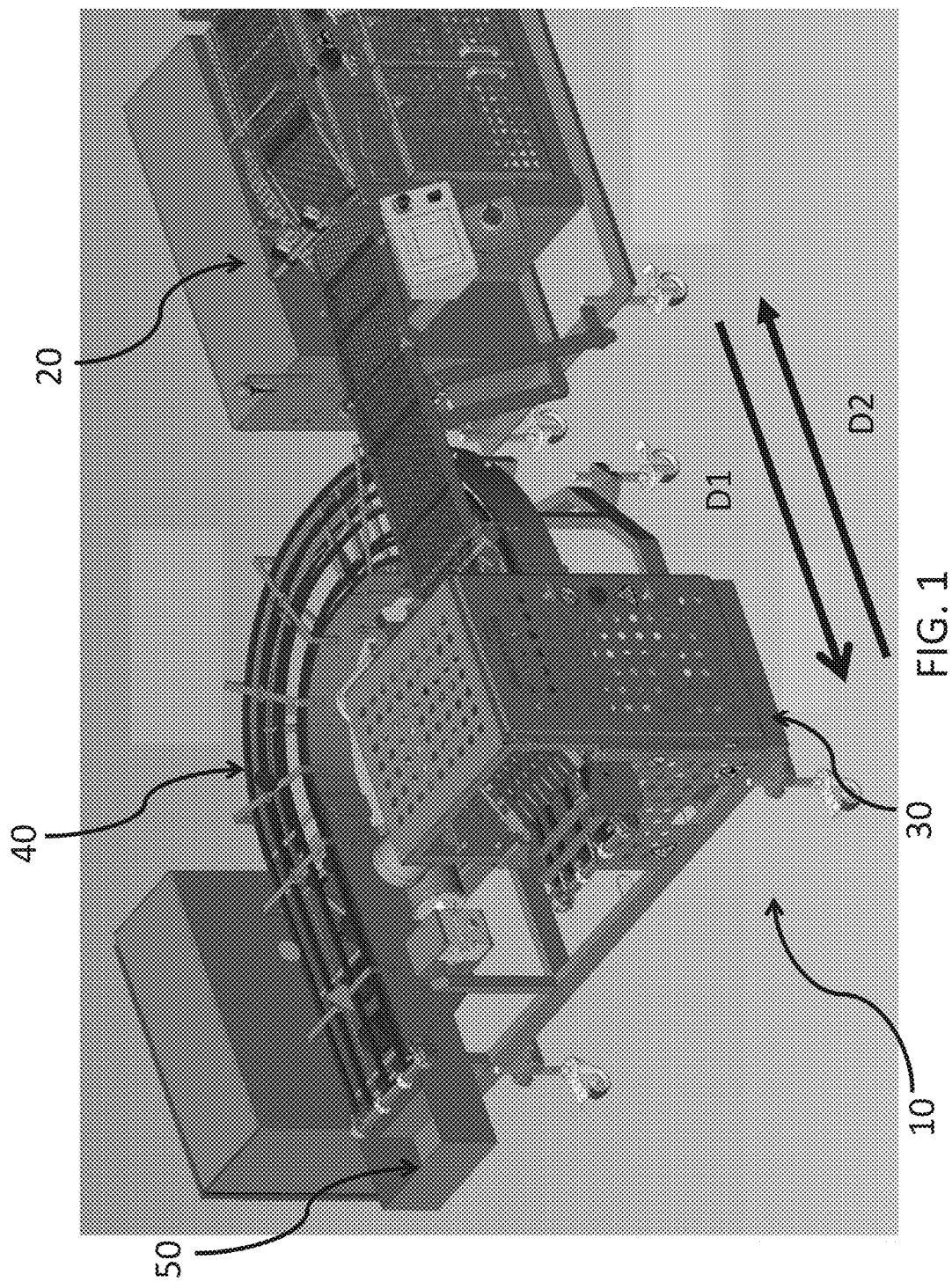
FIG. 1 is a perspective view of a diverting-folding conveyor system according to an embodiment.

Certain terminology is used in the following description for convenience only and is not considered limiting. Words such as "up", "down", "left", and "right" are used for convenience only in describing the directions of certain features noted in the drawings, and are not considered limiting. Additionally, the words "a" and "one" are defined as including one or more of the referenced items unless specifically noted.

Referring to FIG. 1, a diverting-folding conveyor system 10 is illustrated. In one embodiment, the diverting-folding conveyor system 10 generally includes an interleaver assembly 20, a folding-diverter assembly 30, and a semi-circular conveyor assembly 40.

As shown in FIG. 1, in one embodiment, packing machinery 50 can be provided at a terminal end of the semi-circular conveyor assembly 40. The packing machinery 50 can include a vacuum. One of ordinary skill in the art would understand that any additional packaging system or assembly component can be provided at the terminal end of the semi-circular conveyor assembly 40.

Figure 8A:
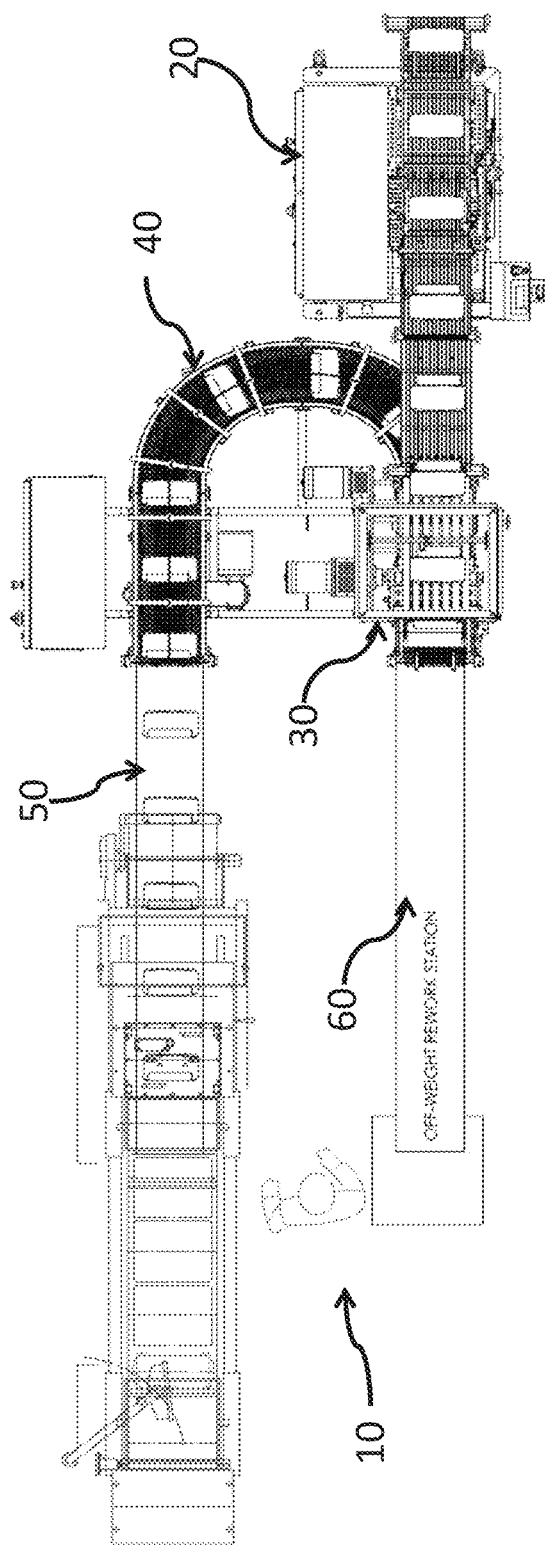
FIG. 8A is an overhead view of the diverting-folding conveyor system.
Figure 8B:
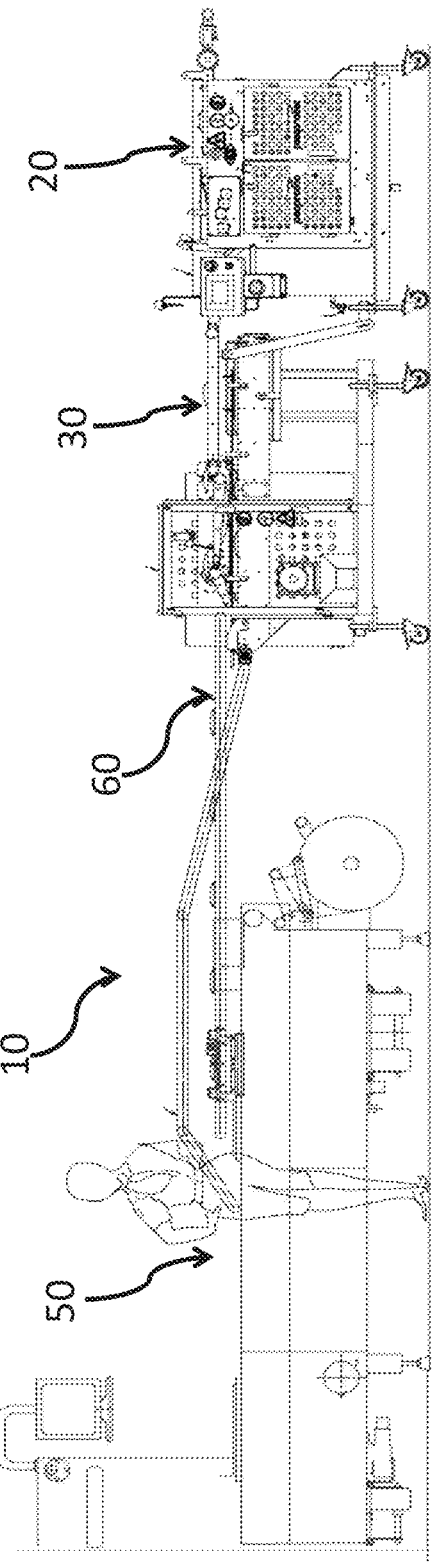
FIG. 8B is a side view of the diverting-folding conveyor system.

FIGS. 8A and 8B provide views of the diverting-folding conveyor system 10 as being used by personnel. FIGS. 8A and 8B further illustrate variations of the packing machinery 50 and an off-weight conveyor 60, which is described in more detail herein.

The interleaver assembly 20 is configured to dispense a substrate under a product 2 to provide a substrate-product combination 6 along an advancing conveyor 32a in a first direction (D1). Interleaving assemblies are generally known, as disclosed in U.S. Pat. No. 8,635,837, which is commonly owned by Packaging Progressions Inc., and is incorporated herein by reference.

The folding-diverter assembly 30 is configured to selectively divert the substrate-product combination 6 in a predetermined direction or path based upon the substrate-product combination 6 weighing a predetermined weight. As shown schematically in FIG. 2, element 70 includes a central processing unit (CPU), programmable logic controller (PLC) or programmable controller, circuitry, memory, user interface, and other electronic component for implementing and carrying out the weighing operation. A motor or driving unit 75 is also schematically illustrated in FIG. 2. The element 70 can include a sensor for detecting the presence of a substrate-product combination 6, which can be used to selectively drive a diverting pusher 34, explained in more detail below, and also includes a weight or mass sensor for detecting a weight of the substrate-product combination 6. Alternatively, the timing of the diverting pusher 34 can be predetermined based on spacing of the substrate-product combination 6.

A diverting conveyor 32b is aligned with the advancing conveyor 32a, and is configured to selectively pivot towards a first path or a second path depending on the weight of the substrate-product combination 6. The motor 75 and the CPU 70 are connected to each other, as well as the diverting conveyor 32b to carry out the pivoting movement of the diverting conveyor 32b.

Figure 2:
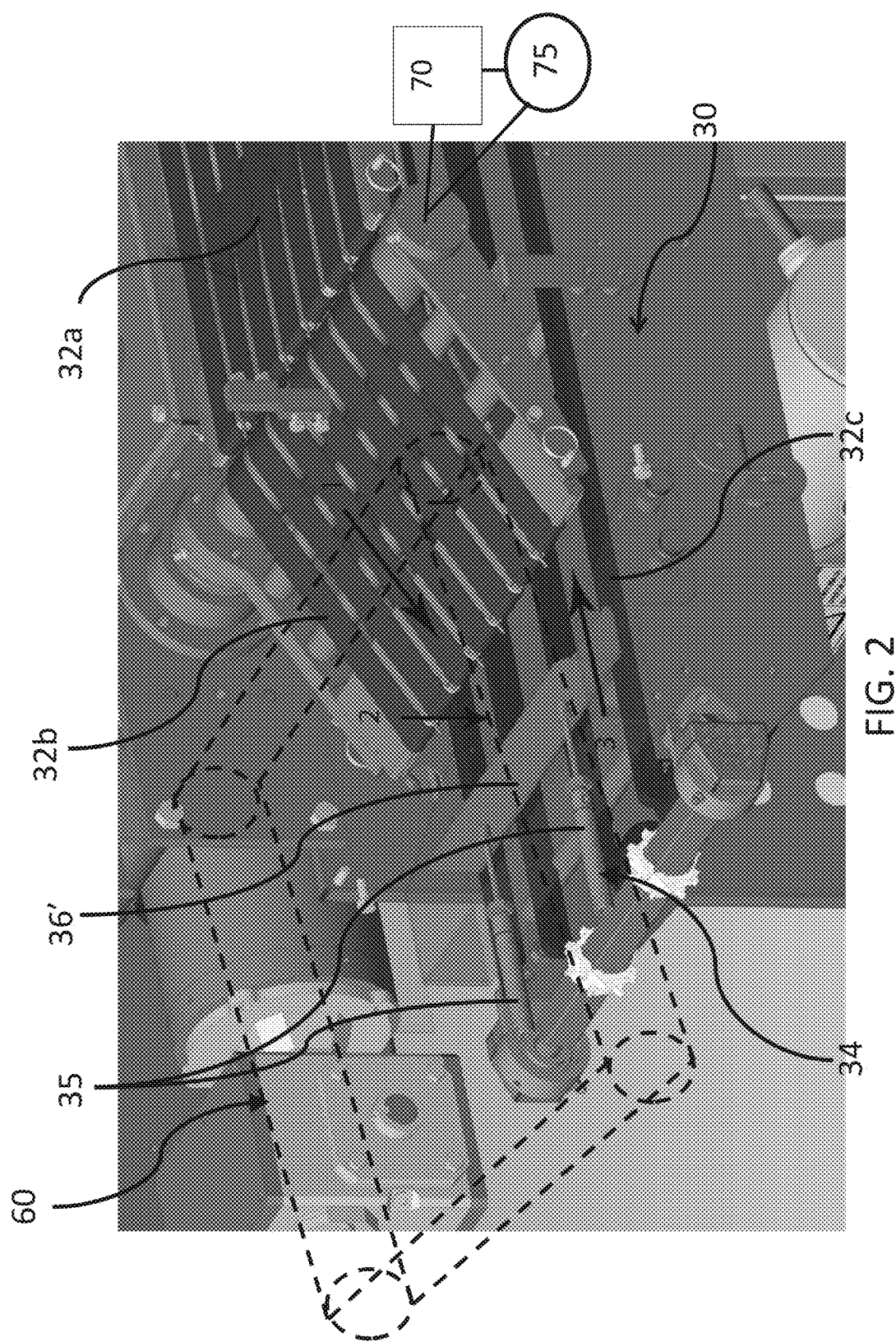
FIG. 2 is a magnified view of a folding-diverter assembly of the diverting-folding conveyor system of FIG. 1.
Figure 3A:
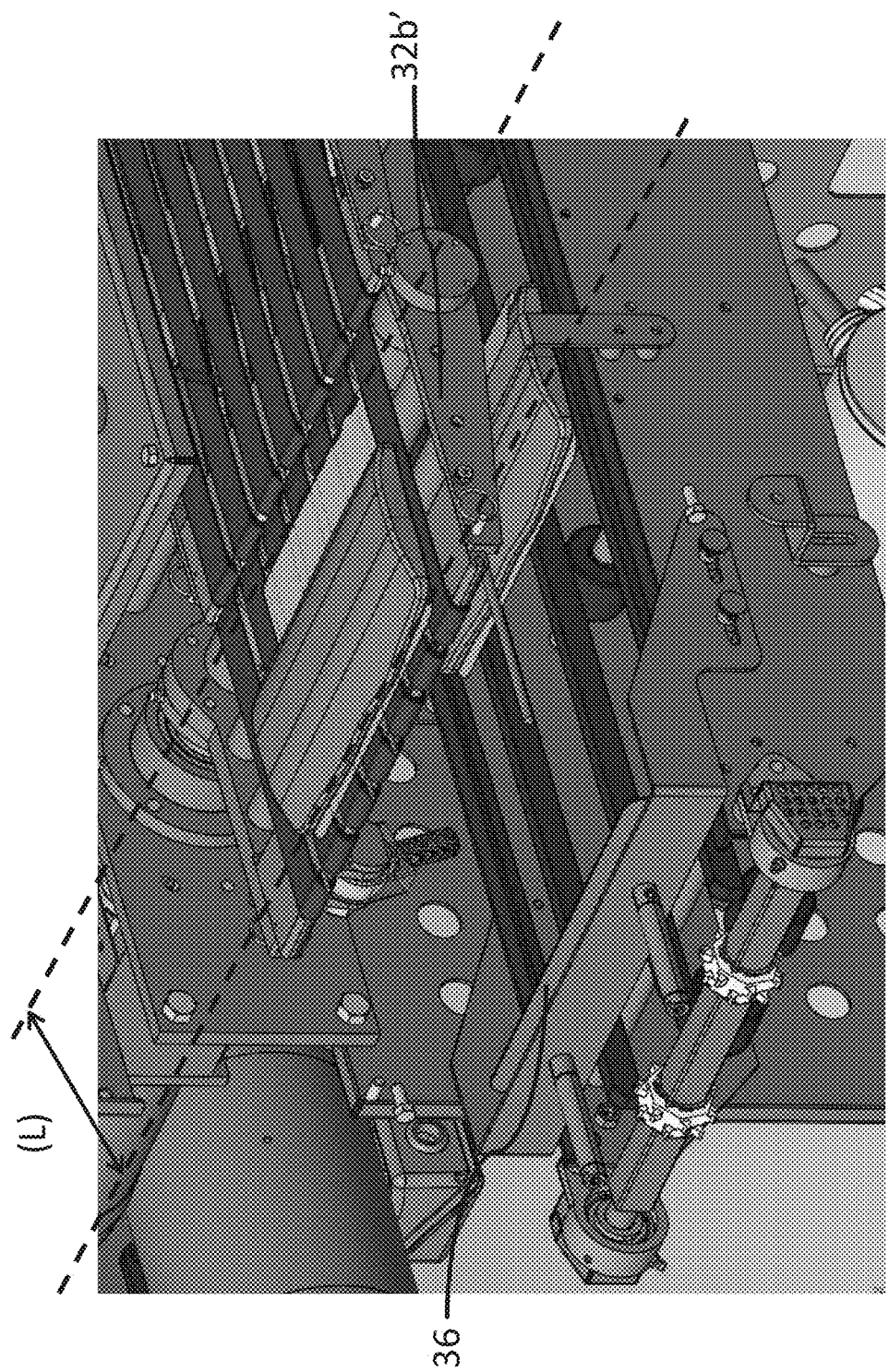
FIGS. 3A and 3B illustrate a diverting conveyor of the folding-diverter assembly in a diverting position.
Figure 3B:
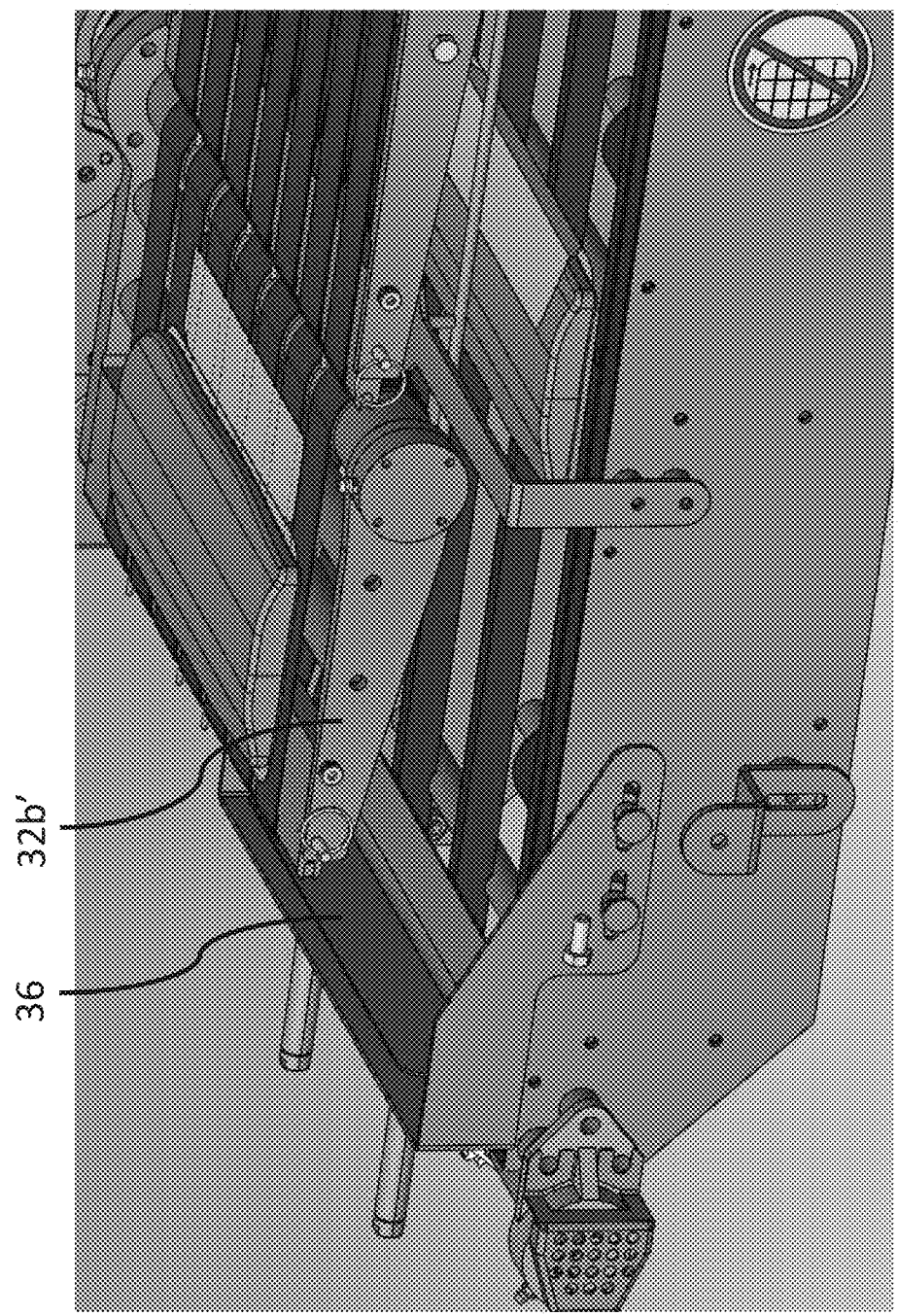

As shown in FIG. 2, an off-weight conveyor 60 is provided for accepting substrate-product combinations 6 that are off-weight. FIGS. 3A and 3B illustrate the diverting conveyor 32b' in a diverting position and arranged to divert the substrate-product combination 6 towards the second path and onto the off-weight conveyor 60.

Figure 4A:
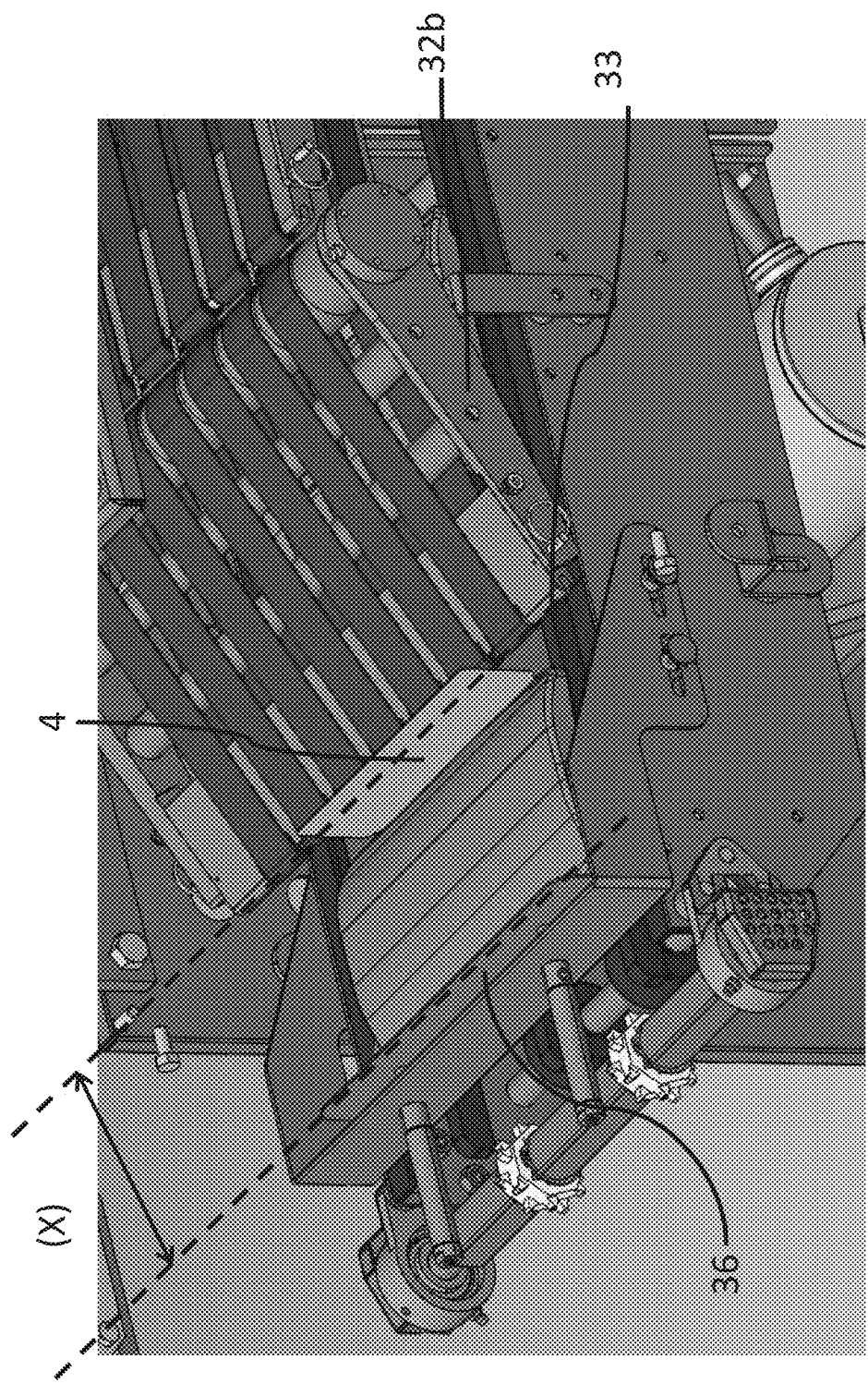
FIGS. 4A and 4B illustrate the diverting conveyor with a leading edge engaging a flap of a substrate-product combination.

When the diverting conveyor 32b pivots to the first path (i.e. the "on-weight" path), as shown in FIG. 4A, the substrate-product combination 6 is driven off of the diverting conveyor 32b with a flap 4 in a trailing position. The folding-diverter assembly 30 is configured to advance the substrate-product combination 6 in a second direction (illustrated as (D2) in FIG. 1), opposite from the first direction (D1). The folding-diverter assembly 30 drives the substrate-product combination 6 in the second direction (D2) via a secondary conveyor 32c and the diverting pusher 34 configured to drive the substrate-product combination 6 in the second direction (D2). The secondary conveyor 32c is aligned with the semi-circular conveyor assembly 40, and the secondary conveyor 32c is driven in the second direction (D2). The diverting pusher 34 can be optional. The secondary conveyor 32c is arranged below the advancing conveyor 32a.

The diverting pusher 34 is arranged above the secondary conveyor 32c and includes at least one driving cylinder 35 connected to a frame 36. The frame 36 is driven to an extended position, shown as 36' in FIGS. 2 and 5, via the cylinder 35. The frame 36 is illustrated in lighter shading in FIGS. 2 and 5 in the resting or original position, and the frame 36 is also illustrated in the resting or original position in FIGS. 3A, 3B, 4A, and 4B. The frame 36 provides a backstop for the substrate-product combination 6 as it drops from the diverting conveyor 32b onto the secondary conveyor 32c. The frame 36 preferably has an L-shaped profile.

Figure 4B:
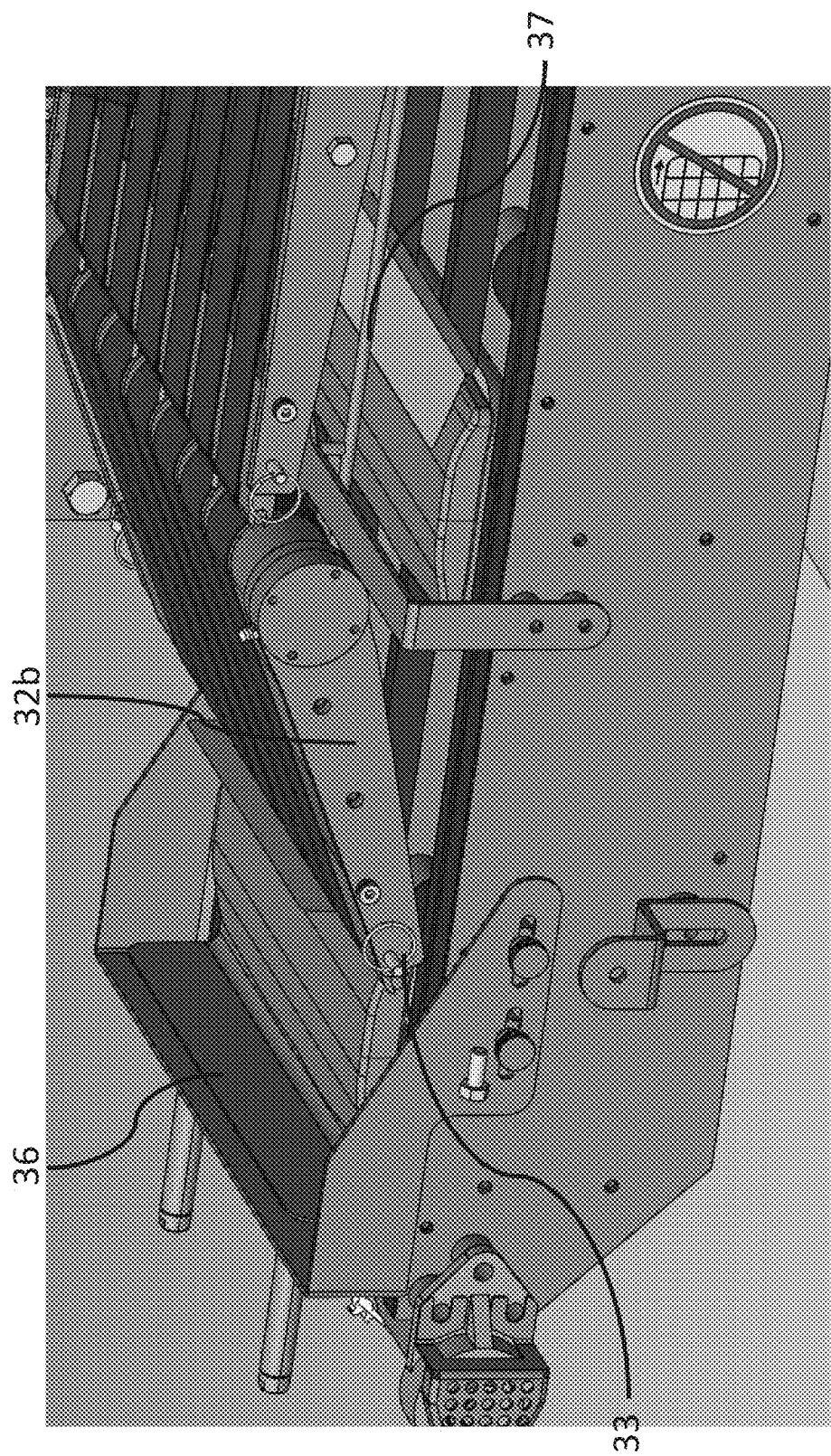
Figure 5:
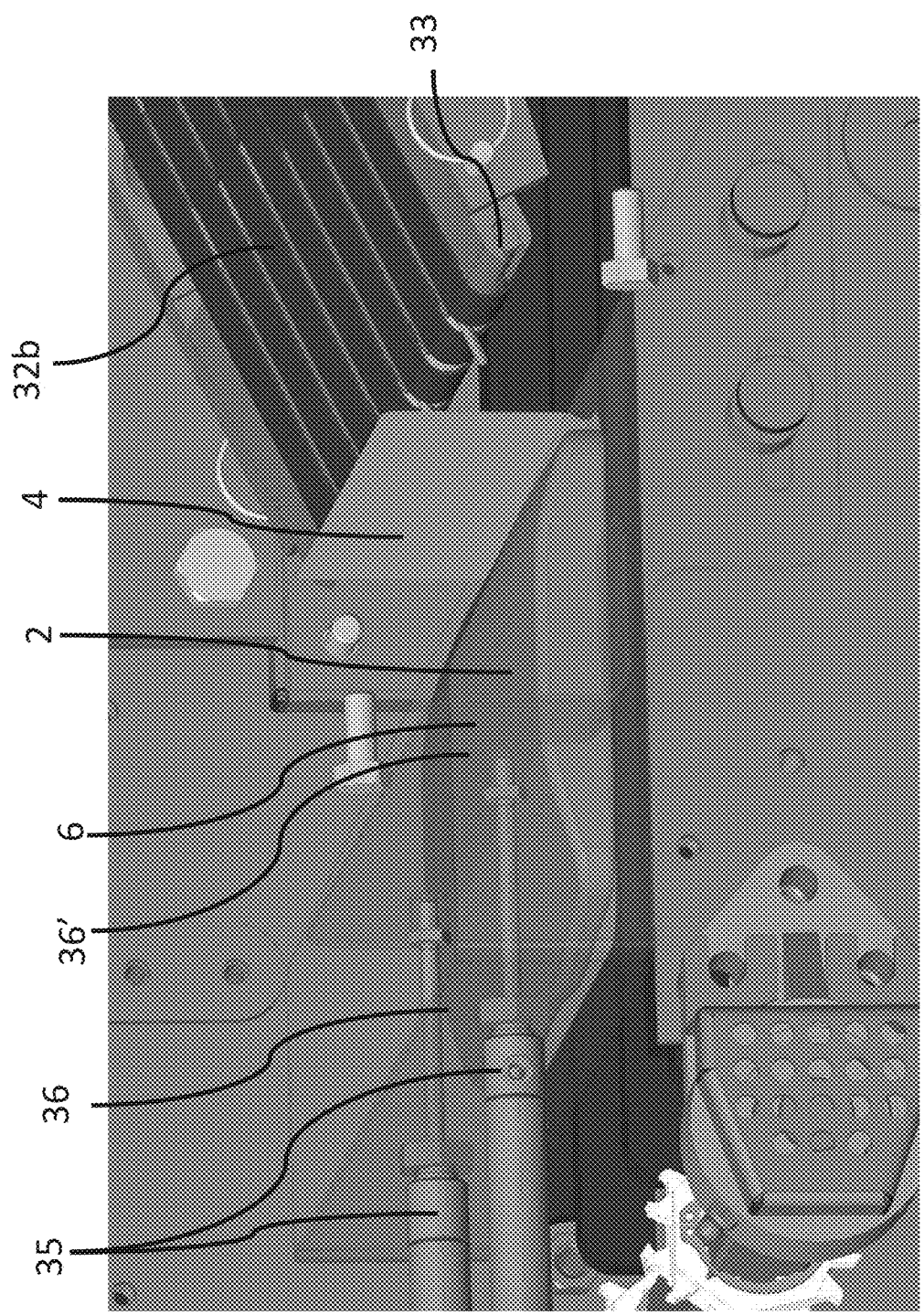
FIG. 5 is a magnified view of the folding-diverter assembly of FIG. 2 with a substrate-product combination in transport.

A leading edge 33 of the diverting conveyor 32b is arranged in an advancing path of the secondary conveyor 32c when the diverting conveyor 32b is pivoted downwards and towards the first path. The flap 4 of the substrate-product combination 6 is forced into a vertical position (shown in FIG. 5), and folded onto the substrate-product combination 6 via engagement with the leading edge 33 as the secondary conveyor 32c advances the substrate-product combination 6 in the second direction (D2). FIGS. 4A, 4B, and 5 best illustrate the leading edge 33 engaging the flap 4 of the substrate-product combination 6.

As shown in FIG. 4A, a gap (X) is defined between the leading edge 33 (while the diverter conveyor 32b is in the lower position) and the diverting pusher 34 (while in a resting, non-extended position). The gap (X) is selected to be less than an overall length (L) of the substrate-product combination 6 including the flap 4 in a flat orientation, as shown in FIG. 3A. This gap (X) ensures that the trailing flap 4 is driven from a flat orientation while on the diverting conveyor 32b to a creased/bent position in which the flap 4 extends vertically as the substrate-product combination 6 drops from the diverting conveyor 32b onto the secondary conveyor 32c. The size of the gap (X) can be adjusted via relative positioning of the components to accommodate smaller or larger substrate-product combinations 6.

Figure 6:
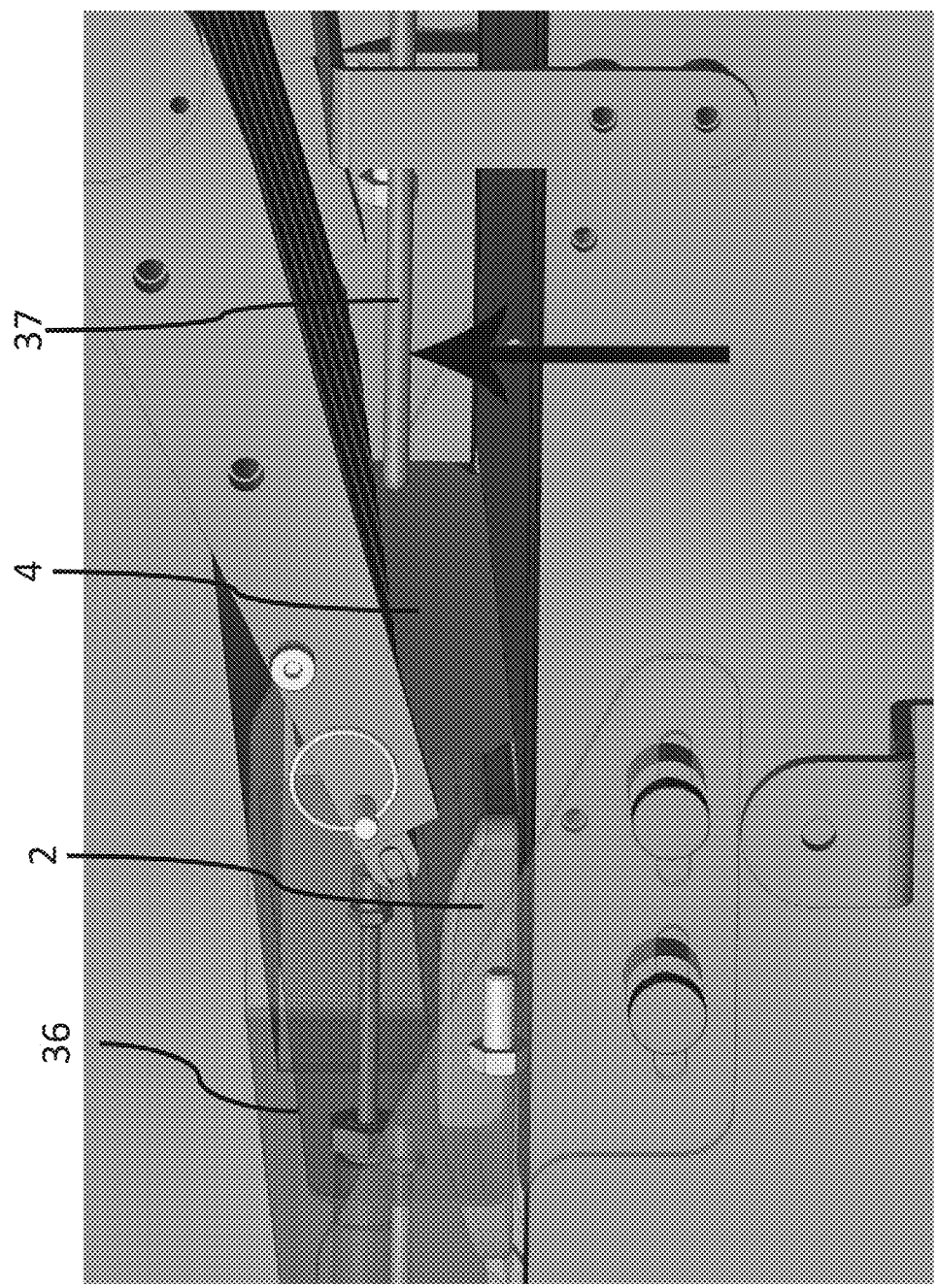
FIG. 6 is another magnified view of the folding-diverter assembly of with the substrate-product combination positioned immediately before folding of a flap.
Figure 7:
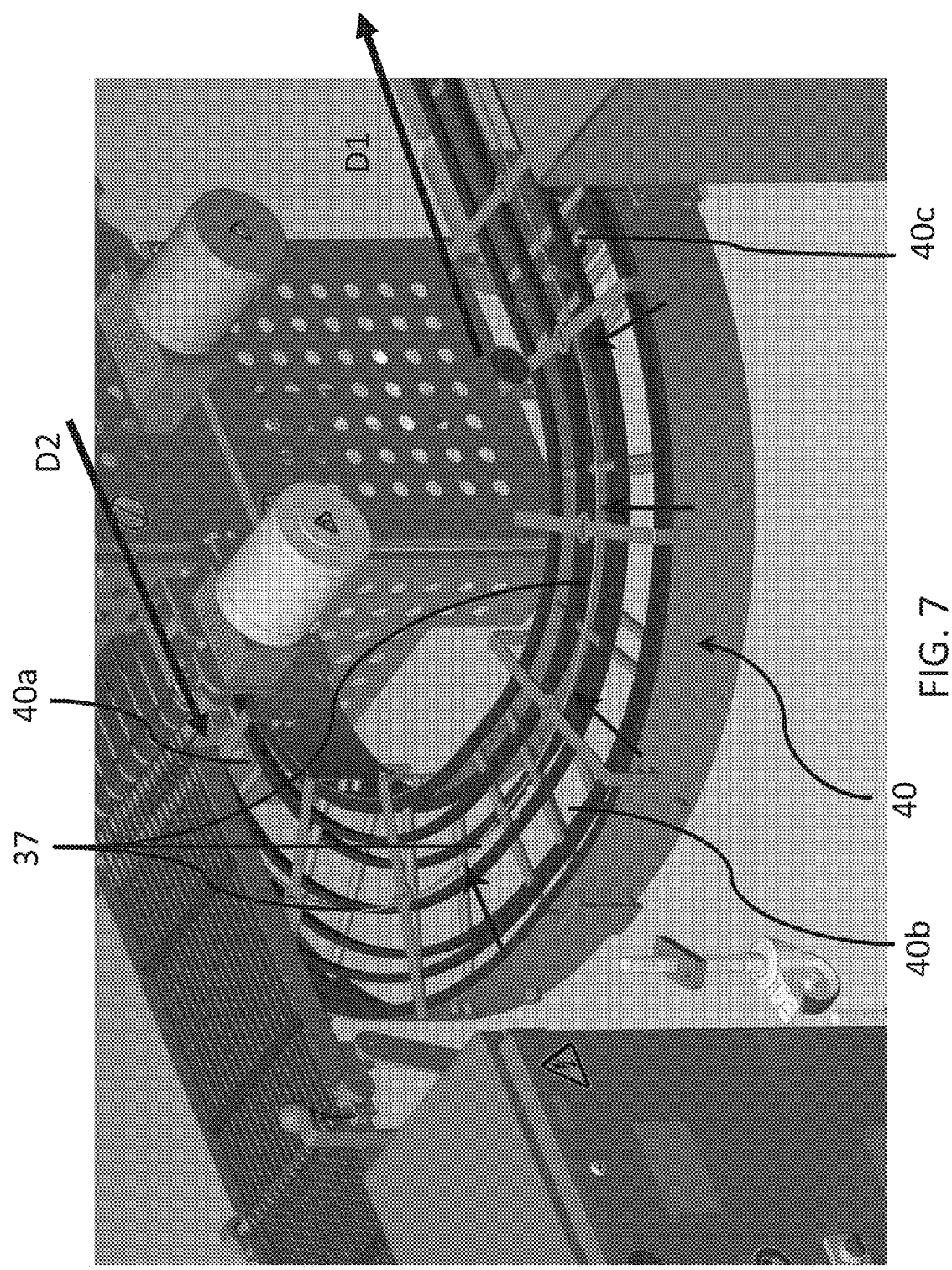
FIG. 7 is an overhead perspective view of a semi-circular conveyor assembly of the diverting-folding conveyor system.

As shown in FIGS. 4B, 6 and 7, an overhead folding bar 37 is arranged above the secondary conveyor 32c and extends along the semi-circular conveyor assembly 40. In one embodiment, as shown most clearly in FIG. 7, the overhead folding bar 37 extends along an entire extent of the semi-circular conveyor assembly 40. The overhead folding bar 37 can include multiple bars or rods.

The overhead folding bar 37 is configured to hold the flap 4 of the substrate-product combination 6 against a top surface of the substrate-product combination 6 as the diverting pusher 34 drives the substrate-product combination 6 into contact with the overhead folding bar 37. The combination of the leading edge 33 and the overhead folding bar 37 fold the flap 4 of the substrate-product combination 6 partially over a top surface of the substrate-product combination 6, as shown in FIG. 4B.

The semi-circular conveyor assembly 40 is configured to advance the substrate-product combination 6 in the second direction (D2) at a first portion 40a of the semi-circular conveyor assembly 40 (i.e. the portion aligned with the secondary conveyor 32c), and along a semi-circular path 40b such that the substrate-product combination 6 is advanced in the first direction (D1) at a second portion 40c of the semi-circular conveyor assembly 40. In one embodiment, the semi-circular conveyor assembly 40 has at least a 180 degree curvature. As the substrate-product combination 6 reaches a terminal end of the semi-circular conveyor assembly 40, the flap 4 is folded over the top surface of the substrate-product combination 6 and is arranged at the leading edge of the substrate-product combination 6.

The arrangement disclosed herein generally provides a more reliable system for folding the flap onto a draft or substrate-product combination. The arrangement includes a series of conveyors, driven in at least two opposite directions, resulting in a substrate-product combination having a leading edge with a folded over flap.

Having thus described in detail a selection of embodiments of the present concept, it is to be appreciated and will be apparent to those skilled in the art that many physical changes could be made in the diverting-folding conveyor system without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. A diverting-folding conveyor system comprising:
a folding-diverter assembly configured to:
selectively divert a substrate-product combination advancing from a first direction in a predetermined path based upon the substrate-product combination weighing a predetermined weight;
advance the substrate-product combination in a second direction, opposite from the first direction; and
fold a flap attached to the substrate-product combination partially over a top surface of the substrate-product combination; and
a semi-circular conveyor assembly configured to advance the substrate-product combination in the second direction at a first portion of the semi-circular conveyor assembly, and along a semi-circular advancing path such that the substrate-product combination is advanced in the first direction at a second portion of the semi-circular conveyor assembly.

2. The system of claim 1, wherein the folding-diverter assembly includes a diverting conveyor configured to selectively pivot towards a first path or a second path depending on the predetermined weight of the substrate-product combination.

3. The system of claim 2, wherein the first path directs the substrate-product combination onto a secondary conveyor aligned with the semi-circular conveyor assembly, and the secondary conveyor is driven in the second direction.

4. The system of claim 3, wherein the secondary conveyor is arranged vertically below an advancing conveyor that advances the substrate-product combination towards the folding-diverter assembly.

5. The system of claim 3, wherein a leading edge of the diverting conveyor is arranged in an advancing path of the secondary conveyor when the diverting conveyor is pivoted towards the first path, such that as the substrate-product combination drops from the diverting conveyor onto the secondary conveyor, the flap of the substrate-product combination is forced into a vertical position and then folded onto the substrate-product combination via engagement with the leading edge as the secondary conveyor advances the substrate-product combination in the second direction.

6. The system of claim 5, wherein the folding-diverter assembly includes a diverting pusher configured to drive the substrate-product combination in the second direction, the diverting pusher is arranged above the secondary conveyor aligned with the semi-circular conveyor assembly, and
a gap (X) is defined between (i) the leading edge when the diverting conveyor is pivoted towards the first path, and (ii) the diverting pusher while in a non-extended position, and
the gap (X) is less than an overall length (L) of the substrate-product combination in a flat orientation.

7. The system of claim 2, wherein the second path directs the substrate-product combination to an off-weight conveyor.

8. The system of claim 1, wherein the folding-diverter assembly includes a diverting pusher configured to drive the substrate-product combination in the second direction, and the diverting pusher is arranged above a secondary conveyor aligned with the semi-circular conveyor assembly.

9. The system of claim 8, wherein the folding-diverter assembly includes an overhead folding bar arranged above the secondary conveyor and extending along the semi-circular conveyor assembly, the overhead folding bar being configured to hold the flap of the substrate-product combination against the top surface of the substrate-product combination as the diverting pusher drives the substrate-product combination into contact with the overhead folding bar.

10. The system of claim 8, wherein the diverting pusher includes at least one driving cylinder connected to a frame.

11. The system of claim 1, wherein the semi-circular conveyor assembly has at least a 180 degree curvature.

12. The system of claim 1, wherein a terminal end of the semi-circular conveyor assembly is aligned with a vacuum packing machine.

13. A diverting-folding conveyor system comprising:
- a diverting conveyor driven in a first direction and configured to selectively pivot towards a first path or a second path depending on a predetermined weight of a substrate-product combination,
  the first path configured to direct the substrate-product combination onto a secondary conveyor, and
  the second path configured to direct the substrate-product combination onto an off-weight conveyor;
- the secondary conveyor driven in a second direction, opposite from the first direction, and arranged below the diverting conveyor, a leading edge of the diverting conveyor being arranged in an advancing path of the secondary conveyor when the diverting conveyor is pivoted towards the first path, such that as the substrate-product combination drops from the diverting conveyor onto the secondary conveyor, a flap of the substrate-product combination is folded onto the substrate-product combination via engagement with the leading edge as the secondary conveyor advances the substrate-product combination in the second direction;
- a semi-circular conveyor assembly aligned with the secondary conveyor and configured to advance the substrate-product combination in the second direction at a first portion of the semi-circular conveyor assembly, and along a semi-circular path such that the substrate-product combination is advanced in the first direction at a second portion of the semi-circular conveyor assembly; and
- an overhead folding bar arranged above the secondary conveyor and extending along the semi-circular conveyor assembly, the overhead folding bar being configured to hold the flap of the substrate-product combination against a top surface of the substrate-product combination as the substrate-product combination is driven along the semi-circular conveyor assembly.

14. The system of claim 13, further comprising a diverting pusher configured to drive the substrate-product combination in the second direction, and the diverting pusher is arranged above the secondary conveyor aligned with the semi-circular conveyor assembly.

15. The system of claim 13, wherein the semi-circular conveyor assembly has at least a 180 degree curvature.

16. The system of claim 13, further comprising a diverting pusher configured to drive the substrate-product combination in the second direction, the diverting pusher is arranged above the secondary conveyor, and
  a gap (X) is defined between (i) the leading edge when the diverting conveyor is pivoted towards the first path, and (ii) the diverting pusher while in a non-extended position, and
  the gap (X) is less than an overall length (L) of the substrate-product combination in a flat orientation.

* * * * *